3,277,033
POLYAMIDES FROM AN ISONITRILE, A CARBOX-
YLIC ACID, AN AMINO AND A CARBONYL
COMPOUND AND A PROCESS FOR THEIR MAN-
UFACTURE
Ivar Ugi, Leverkusen, Germany, assignor to Farbenfabri-
ken Bayer Aktiengesellschaft, Leverkusen, Germany, a
German corporation
No Drawing. Filed Mar. 7, 1963, Ser. No. 263,416
Claims priority, application Germany, Mar. 15, 1962,
F 36,282
27 Claims. (Cl. 260—18)

The present invention relates to polyamides and a new process for their manufacture, said polyamides vary in their properties but all have valuable properties as synthetic resins.

It is already known that carboxylic acid amides are obtained when a carboxylic acid (Ia), an amine (IIa), a carbonyl compound (IIIa) and an isonitrile (IVa) are condensed together (I. Ugi, Ang. Chem. 74, 9–22 (1962)). The course of the reaction in this so-called α-aminoalkylation of isonitriles and carboxylic acids may be represented by the following reaction scheme:

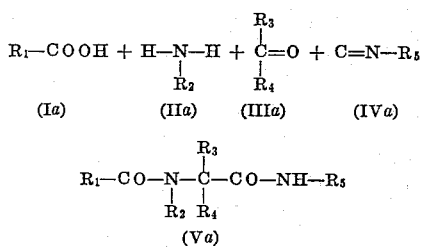

in which $R_1$–$R_5$ represent organic radicals such as alkyl and aryl radicals but may also represent hydrogen atoms.

If two of the four condensation components Ia–IVa are bifunctional compounds, linear polymers are obtained. If condensation components with more than two bifunctional groups are used, cross-linked polymers are obtained.

Both the linear and the cross-linked polymers are resinous sticky or brittle products. By this method it is not possible to obtain polymers with properties that make them suitable for use as synthetic resins.

It has now been found that polyamides with valuable properties as synthetic resins are obtained by condensing together a carboxylic acid component, a carbonyl component and an isonitrile component in which at least two of the condensation components are bifunctional and at least one of the polyfunctional condensation components has a molecular weight between 300 and 200,000, the molar ratios between carboxyl group, amino group, carbonyl group and isonitrile group not deviating by less than 50% from the equimolecular ratio.

It must be regarded as quite unexpected that in contrast to the above mentioned brittle and resinous polyamides, polyamides with good synthetic resin properties may be obtained only when at least one of the condensation components has a molecular weight between 300 and 200,000 and the molar ratio of the individual functional groups varies only within a narrow range. This unexpected discovery results further in the great advantage that polyamides with a low proportion of the isonitrile component may be produced, since the isonitrile component is technically the most difficult of all the condensation components to obtain.

The normally solid substantially water-insoluble polyamides have a repeating unit consisting of

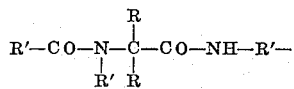

groups, where each R is selected from the group consisting of hydrogen, an alkyl and an aryl radical, and R′ is hydrogen, an alkenyl, an aryl and a cycloalkenyl radical, said repeating unit being incorporated by polycondensation to produce said polyamide of (A) a carboxylic compound, (B) an amino compound, (C) a carbonyl compound, and (D) an isonitrile.

The course of the reaction in the polycondensation according to the invention may be represented by the following reaction scheme

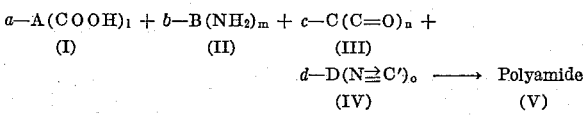

In this scheme, A, B, C, and D represent mono-, di-, or polyvalent organic radicals, $a$, $b$, $c$, and $d$ represent the number of mols of the condensation components I–IV put into the reaction, and $l$, $m$, $n$ and $o$ indicate the number of functional groups contained in the molecules. In an accurately stoichiometrical polycondensation, the ratio of the molar number of the reactive groups, namely $(a \cdot l):(b \cdot m):(c \cdot n):(d \cdot o) = 1:1:1:1$. One may dviate from this ratio up to 50%. The molar ratios between the individual reactive groups then lie between 0.5:1 and 1.5:1. When $l$ or $m$ or $n$ or $o \gg 2$, e.g. $>5$, then the corresponding polyfunctional components may be used in an excess which is greater than 50%. These molar ratios relate in each case to the polyamide finally obtained.

In principle, at least two of the parameters $l$, $m$, $n$, $o$ must be greater than 1 in the polycondensation according to the invention. A further condition is that at least one condensation component which has a parameter of at least two must at the same time have a molecular weight between 300 and 200,000.

A large number of condensation components I–IV may be used for the process according to the invention.

By the term "carboxylic acid components (I)" we mean the following groups of compounds:

(1) Aliphatic, aromatic and heterocyclic mono- and polycarboxylic acids. They may be low molecular weight carboxylic acids as well as high molecular weight carboxylic acids with a molecular weight between 300 and 200,000.

Specific examples of such low molecular weight carboxylic acids are: Fumaric acid, acetic acid, n- and isobutyric acid, crotonic acid, sorbic acid, oleic acid, trifluoroacetic acid, fatty acids of linseed oil, benzoic acid and its nuclear substitution products such as p-chlorobenzoic acid and o- and p-hydroxybenzoic acid, succinic acid, maleic acid, adipic acid, azelaic acid, sebacic acid, itaconic acid, citric acid, hexachloro-tetrahydro-endomethylene-phthalic acid, pyridinic-2,5-dicarboxylic acid, 1,2,4- and 1,3,5-benzene-tricarboxylic acids, o-, m, p- benzenedicarboxylic acids, pyromellitic acid, and naphthalinic-2,7-dicarboxylic acid.

The following are examples of high molecular weight carboxylic acids that may be used:

Homogeneous and mixed polyesters with two or more free carboxyl groups, obtainable by known processes from di- and tricarboxylic acids and from diols or triols. These polyesters may contain in addition monofunctional alcohols, monocarboxylic acids, phosphoric acid, polyhydroxyl compounds with more than three hydroxyl groups and amino alcohols as structural units. These polyesters may contain, for example, as glycol components the following: Ethylene glycol, diglycol, triglycol, octaglycol, polyglycols with molecular weights of 300 to 2000, 1,2- and 1,3-propanediol, monochlorohydrin, polypropylene oxides having molecular weights between 100 and 1000 and carrying terminal hydroxyl groups, 1,3-, 2,3- and 1,4-butanediol, 1,4-butenediol, polyethers derived from 1,4-butanediol, 1,6- and 2,5-hexanediol, 1,10-decanediol, 2,2 - dimethyl-1,3-propanediol, 3-methyl-2,4-pentanediol, octadecene - 9,10 - diol - (1,12), di-p-($\beta$-hydroxyethoxyphenyl)-propane-(2,2), dihydroxyethyl-hydroquinone, dihydroxyethyl-m-toluidine, glycerol, 1,2,4-butanetriol, trimethylol-propane, 1,2,6-hexanetriol, pentaerythritol, mannitol and cane sugar. The following monofunctional alcohols may also be incorporated in the esters: Methanol, chlorohydrin and allyl alcohol. As carboxylic acid components of the polyesters there may be used the above mentioned carboxylic acids and, in particular, acetic acid, dichloroacetic acid, acrylic acid, sorbic acid, fatty acids of linseed oil, laevulinic acid, oxalic acid, succinic acid, maleic acid, dichlorosuccinic acid, itaconic acid, adipic acid, azelaic acid, tetrapropenyl-succinic acid diglycollic acid, tartaric acid, benzoic acid, 3,4-dichlorobenzoic acid, o-, m- and p-benzene-dicarboxylic acids, 1,2,4-benzene tricarboxylic acid and pyromellitic acid.

The following are specific examples of polyesters with free carboxyl groups:

Polyesters of adipic acid and ethylene glycol having an average molecular weight of 200–5000; acid polyesters obtained by ester interchange of linseed oil with trimethylol propane and benzene-1,2,4-tricarboxylic acid and polyester or polyether carboxylic acids obtained from diols or polyols by reaction with cyclic carboxylic acid anhydrides or carboxylic acid polyanhydrides. Polyesters which may be used for this purpose are adipic acid ethylene glycol polyesters and adipic acid diglycol polyesters with hydroxyl numbers of 25 to 300. Polyethers that may be used are polyethylene oxide, polypropylene oxide or polytetrahydrofurans with terminal hydroxyl groups having hydroxyl numbers of 25 to 300. Acid anhydrides which may be used include succinic acid anhydride, glutaric acid anhydride, maleic acid anhydride, phthalic acid anhydride, hexachloro-endomethylene-tetrahydrophthalic acid anhydride, hexahydrophthalic acid anhydride, 1,2,4-benzenetricarboxylic acid anhydride, pyromellitic acid anhydride, naphthalic acid anhydride and adipic acid anhydride.

Other carboxylic acid components that may be used are polycarboxylic acids with a molecular weight of 300 to 200,000, e.g. polyamides with carboxyl groups, e.g. polyamide carboxylic acids obtained from hexamethylene diamine and excess adipic acid, or polycarboxylic acids obtained by polymerization or copolymerization of acrylic acid or maleic acid semi-esters or semi-amides, or analogous derivatives of itaconic acid, or by partial or total saponification of high molecular weight compounds with ester-, amide-, cyclic anhydride- or nitrile groups, e.g. partially saponified polyacrylic acid methyl ester having a molecular weight of 400 to 10,000 with carboxyl numbers 30 to 300.

Suitable acid components also include polycondensation products of formaldehyde and phenol carboxylic acid, e.g. salicylic acid, p-hydroxybenzoic acid, resorcinol carboxylic acid and mixtures thereof with phenols.

(2) In addition to compounds with free carboxyl groups there may also be used carboxylic acid esters which split off alcohol under the reaction conditions, and anhydrides.

Examples of readily saponifiable esters are cyanic methyl ester, vinyl acetate, $\alpha$-alkoxy-alkyl ester and gem-diacyloxyalkanes. Examples are: Cyano methyl butyrate, gem-diacetoxy-ethane, $\alpha$-amino-acyloxy-ethanes and piperidino-methyl acetate.

Examples of carboxylic acid anhydrides that may be used include: Acetic acid anhydride, succinic acid anhydride, adipic acid anhydride, phthalic acid anhydride and pyromellitic acid anhydride, particularly when obtained by condensation in the presence of polyols.

By amine components (II) we mean the following groups of compounds:

(1) Aliphatic, aromatic and heterocyclic mono- and polyamines with primary amino groups. They may be low molecular weight compounds or have a molecular weight between 300 and 200,000. The following are examples of suitable primary amines: Methylamine, n-, iso-, sec.- and tertiary-butylamine, ethanolamine, propanolamine, benzylamine, 3-dimethylaminopropylamine, aniline, p-chloroaniline, $\alpha$-naphthylamine and $\alpha$-aminopyridine; ethylenediamine, tetramethylenediamine, hexamethylenediamine, diamines of diols or polyolefine oxides of the general formula

or

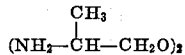

where X represents difunctional hydrocarbon or polyether radicals which may contain amine bridges or thioether bridges; polyethylene polyamines of the general formula

($n=1$–50), m-phenylenediamine, 2,4- and 2,6-diaminotoluene, 1,5-naphthylenediamine, benzidine, 3,3'-dichlorobenzidine, 4,4'-diaminodiphenylmethane, melamine, 1,2-dianilino-ethane and sodium 4,4'-diamino-stilbene-3,3'-disulphonate, polyamines with a molecular weight of 300–200,000 which may be obtained by the usual processes from low molecular weight units which contain amine groups; polyamines obtained from high molecular weight compounds by converting other functional groups into amino groups, for example:

Polymers and polyaddition products of ethyleneimine, polyamides with free amino groups, e.g. polyamides obtained from adipic acid and excess hexamethylenediamine, basic polyurethanes which may be obtained by the addition of glycols and polyester alcohols with the grouping —X—$CH_2$—$CH_2$—OH (X=O, S) to diisocyanates, followed by splitting off carbonic acid by heat.

(2) Secondary amines may be used instead of primary amines. If the secondary amines contain two amino groups, the two amino groups will react like one primary amino group. One of the secondary amino groups reacts with the carboxylic acid and the other secondary amino group reacts with the carbonyl compound (see first reaction scheme). The amide according to the first reaction scheme thus contains two nitrogen atoms and a bridge connecting them instead of the amine.

When secondary amines which contain only one amino group are used, they have a chain breaking effect. They enter in the terminal position.

Examples of secondary amines include: N,N'-dimethylethylenediamine, N,N'-diphenylethylenediamine, methylaniline, dimethylamine, morpholine-pyrrolidine and ethylene imine.

(3) Ammonia may be used instead of the primary amines.

By carbonyl components (III) we mean both ketones and aldehydes. Both carbonyl compounds may contain one or more functional groups. They may be low molecular weight compounds or they may have a molecular weight between 300 and 200,000.

The following are specific examples of low molecular weight carbonyl compounds: Formaldehyde, acetaldehyde, propionaldehyde, β-chloropropionaldehyde, acrolein, glycidyl aldehyde, n- and iso-butyraldehyde, crotonic aldehyde, aldol, hydroxy-pivalinic aldehyde, isohexylaldehyde, acetone, methyl ethyl ketone, diethyl ketone, methyl vinyl ketone, cyclohexanone, hydrocinnamic aldehyde, benzaldehyde, salicyclic aldehyde, 2,4-dichlorobenzaldehyde, acetophenone, glutaric dialdehyde, acetonyl acetone, terephthalic dialdehyde, 1,3,5-triacetylbenzene and the disulphide of α-mercapto-isobutyric aldehyde.

The high molecular weight polycarbonyl compounds may be obtained by polymerization, polyaddition or polycondensation from monomers which contain carbonyl groups or from monomers which contain groups which can be converted into carbonyl groups. Examples of such compounds are polyurethanes obtained by condensation with mono-, di- or polyhydroxycarbonyl compounds. The following compounds may be used as hydroxycarbonyl compounds: Aldol, glycerol aldehyde, hydroxypivalinic aldehyde, hydroxyacetone and dihydroxyacetone; polymers or copolymers of acrolein, of methylvinyl ketone or of vinyl benzaldehyde; dialdehydes, which may be obtained by partial ozonization (and subsequent reduction of the ozonide) of polymers or copolymers of styrene or 1,3-diolefines, such as butadiene, isoprene and dimethyl-butadiene.

The isonitrile components (IV) may be aliphatic, aromatic or heterocyclic mono- or polyisonitriles. The isonitrile components may be low molecular weight compounds or they may have a molecular weight of 300 to 200,000.

The following compounds are specific examples of isonitrile components:

5-methyl-5-isocyanic-1,3-dioxane-2-one; ethyl-, allyl-, n- and tertiary-butyl-, cyclohexyl-, cyclohexenyl-, benzyl-, phenyl-, o- and p-toluyl-, p-anisyl-, 2,4-, 2,5- and 2,6-xylyl-, 2,6-diethylphenyl-, 2,4,6-trichlorophenyl- and β-naphthylisocyanide; di-(2 - methyl - 2 - isocyanic-1-propyl)-carbonate; 1,4-butane-, 1,6-hexane-, 2,4-toluylene, 1-methyl-3,5-diethyl-2,4-phenylene-, 1,5-naphthylene-, 4,4'-diphenylmethane-, 4,4'-diphenylene-, 3,3',5,5'-tetraethyl-diphenylurea-4,4'-, tri-(3,5 - diethyl - 4-isocyanicphenyl)-methane-, 3,3',5,5'-tetraethyl-4,4'-diphenylmethane-diisocyanide and 4-α-isocyanicethyl-phenylisocyanide. In addition, polyisonitriles may be used which have been obtained from simple isonitriles such as tertiary butylisocyanide or cyclohexylisocyanide or mixtures thereof with unsaturated hydrocarbons such as butadiene by radical linkage, for example by means of Fenton's reagent.

Examples of polyisocyanides of molecular weight 300–200,000 which have been obtained by known processes by polymerization, polyaddition and polycondensation from low molecular weight starting materials which contain isocyanide groups include:

Polyurethanes into which have been incorporated, by condensation, a polyhydroxy-isocyanide such as 1-(β-hydroxyethylcarbamino)-2-methyl-2-isocyanic - propanol-(3) (obtainable from 2-methyl-2-formylamino - 1,3 - propanedial and phosgene in triethylamine followed by condensation with ethanolamine) or polyurethanes into which copolymers of allyl isocyanide and suitable monomers such as styrene or butadiene have been incorporated by condensation.

In addition to the condensation components I to IV given above, other condensation components may be used as starting materials for the process according to the invention.

For example, instead of using a certain compound with a certain functional group, a mixture of compounds which have the same functional groups may be used, for example several different carboxylic acids may be used instead of one carboxylic acid. It is therefore possible to use mixtures of condensation components which have the same functional group but a different reactivity. When such mixtures are used, a precondensate is first formed which is condensed out at higher temperatures.

It is also possible to use condensation components which contain several different functional groups in the molecule. Suitable compounds of this type are mainly those which contain an amino group and/or a carbonyl group in addition to a carboxyl group. Furthermore, carbonyl compounds which contain isonitrile groups may be used.

Examples have already been given in the list of condensation components mentioned above. In addition, amino acids such as glycine, β-alanine and ε-aminocaproic acid may be used, as well as keto acids such as laevulinic acid or aldehydic acids such as terephthalic aldehyde acid.

Condensation products of amines and carbonyl compounds may be also used instead of the amino components and the carbonyl components.

As condensation products between primary amines and aldehydes or ketones there may be used the corresponding Schiff's bases, and as condensation products between secondary amines and aldehydes or ketones there may be used enamines, aminals, imidazolidine derivatives and hexahydropyrimidine derivatives.

In carrying out the polycondensation according to the invention, the amino components and carbonyl components may first be precondensed to form a precondensate to which the other condensation components may then be added. Water is split off in the course of the precondensation. The condensation between the condensation products of amine and carbonyl compounds on the one hand and carboxylic acids and isonitriles on the other then takes place without water being split off. The result of the condensation is then simply an addition. This reaction takes place even at relatively low temperatures, so that the use of condensation products of amines and carbonyl compounds is particularly advantageous.

The following Schiff's bases are particularly suitable: Benzalaniline, cyclohexanone-n-butylimide, N,N'-isobutylidene hexamethylene diamine, 2-ethyl-hexen-(2)-al-(1)-phenylimide and terephathalic - dialdehyde - dicyclohexylimide. Polyfunctional condensation products such as the condensation product of terephthalic dialdehyde and hexamethylene diamine may also be used, if desired in the presence of a monofunctional carbonyl compounds such as cyclohexanone, or condensation products of mixtures of amines with mixtures of carbonyl compounds. Morpholine-cyclohexene is an example of a suitable enamine, and dipiperidine-methane is an example of a suitable aminal. Other examples are 1,3-diphenylimidazolidine and urotropin. As high molecular weight condensation products having a molecular weight between 300 and 200,000 there may be used, for example, polyurethanes in which polyhydroxy Schiff's bases have been incorporated as cross-linking components. Such cross-linking components are, for example, the condensation product of 2 mols of hydroxypivalinic-aldehyde and 1 mol of hexamethylenediamine or 1 mol of m-phenylenediamine. Other cross-linking components are Schiff's bases of amino alcohols, such as aminoethanol or dicarbonyl compounds such as terephthalic dialdehyde.

The condensation of the components may be carried out either in solution or without solvents.

Suitable solvents are: Water or organic solvents such as alcohols, e.g. methanol, ethanol, n-butanol, methyl glycol, glycol, diglycol; esters such as ethyl acetate, glycol monomethyl ether acetate and ethyl acetoacetate; ethers such as diethylether, tetrahydrofuran, diglyme, dioxane and anisole; aldehydes and ketones which may, in some cases, take part in the condensation as carbonyl condensation components (III), such as isobutyraldehyde, benzaldehyde, acetone, methyl ethyl ketone, methylisobutyl ketone, methylbenzyl ketone, acetophenone; hydrocarbons, halogenated hydrocarbons and inert polar solvents such as nitrobenzene, pyridine, dimethylformamide or dimethylsulphoxide.

The polymerization according to the invention is carried out at low or high temperatures depending on the reactivity of the individual reaction components: The condensation temperatures will generally lie between —20 and +250°, preferably between +10 and +120°, although higher or lower temperatures may be employed.

Various methods may be used for carrying out the polycondensation.

The condensation components may all be dissolved together in a solvent or they may be melted together or rolled together. In principle, it is not necessary to add accelerators for the reaction although, for example, boron fluoride-etherate or dioctyl-tin-dilaurate or orthotitanic-acid-tetrabutyl ester may be added. The addition of one of these compounds slightly accelerates the reaction, but in principle the advantage of the polycondensates according to the invention is that they do not contain any additives.

One preferred method of carrying out the polycondensation consists in preparing a precondensate which is then condensed out in a second condensation stage. The precondensate is prepared by breaking off the condensation process by cooling or by adding one component in excess, for example of about 0.2 to 0.8 per mol of the other reactive groups, so that "living polymers" are obtained. The precondensate may also be prepared by using components having groups of different reactivity or mixtures of components with different reactivities or functions. The condensation is completed by a suitable heat treatment or by adding the missing reaction components.

The polycondensates according to the invention may be subsequently cross-linked or cured by known processes by means of sulfur, formaldehyde, hexamethylenetetramine or polyepoxides and by means of resoles such as poly-o-hydroxymethylphenols or peroxides such as dicumylperoxide.

These products may, if desired, even be added during the polycondensation process, in which case cross-linking occurs by additional reaction.

Difficultly inflammable polymers may be obtained by using condensation compounds which contain phosphoric ester groups or halogen such as fluorine, chlorine or bromine.

Auxiliary substances and additives such as stabilizers against light, oxygen, water and chemicals, dyestuffs and optical brightening agents, plasticisers and fillers may be added to the components before condensation or may subsequently be incorporated into the synthetic resins. Dyestuffs, optical brighteners and stabilisers may also be incorporated into the macromolecule by way of reactive carboxyl-, amino-, carbonyl- or isonitrile-groups in the course of condensation.

The polycondensation may be allowed to proceed simultaneously with other polycondensations, polyadditions or polymerization. When carried out in combination with isocyanate polyaddition, the process according to the invention may be used to build up cross-linkages which are stable to heat and chemically stable and may be predetermined in their constitution.

The process is suitable also for terminal cross-linking of synthetic resins which contain carboxyl-, primary or secondary amino-, carbonyl- or isonitrile-groups. The functional groups contained in the polymers are then converted in accordance with the invention. This produces a cross linkage which is extremely stable to heat and which imparts additional strength to the structure by hydrogen bonding.

The process according to the invention is suitable also for making foam plastics. The usual compounds that split off gas may be used as blowing agents in that case. Air may be stirred into the mixture or low boiling solvents such as petroleum ether may be added. The organic solvents are driven off by steam. One particular method of carrying out the process comprises the use of amine components in the form of carbonates or bicarbonates. When the amine component reacts, carbon dioxide is liberated.

Emulsions of synthetic resins such as polyvinyl chloride, polyacrylonitrile, polystyrene, phenolic resins or acetyl cellulose in aqueous or aqueous-organic solutions of the condensation components according to the invention are suitable for use as paints and for coating textiles, leather and paper and for fixing dyestuffs. Polycondensation occurs and a durable film is obtained.

The products according to the invention are synthetic resins which may be worked up by the usual processes employed for synthetic materials such as elastomers, thermoplasts, casting or pouring masses, lacquers and adhesives.

The great range of variation in starting materials provided by the four components makes it possible to produce synthetic resins of very different properties which may be used for a large number of different purposes. It is possible to obtain products which are distinguished by their good stability to heat, resistance to solvents and chemicals and oxygen and good mechanical properties and which are easily worked up. In particular, it is possible to produce materials that can be cast and sprayed, moulding materials, elastomers and starting materials for fibres and foils. Another advantage is that a part of the product according to the invention may be after-hardened by heat.

The products obtained by the process may be used as lacquers, adhesives, gelatine substitutes, auxiliary agents for textiles, foam plastics, sealing materials, coating materials and ionic exchangers.

When the known reactions suitable for making synthetic resins do not take place quantitatively, they lead to products of low molecular weight, or when these reactions are accompanied by cross linking they lead to the formation of macromolecules with unwanted side chains. Both these factors impair the mechanical properties and chemical resistance of the finished products. This disadvantage is on the whole avoided in the condensation according to the invention if more than two of the condensation components I to IV are di- or polyfunctional.

*Example 1*

200 parts by weight of adipic acid-ethylene glycol polyester with a hydroxyl number of 56 and molecular weight 2000 are reacted for four hours at 130° with 31 parts by weight of hexahydrophthalic acid anhydride. The reaction mixture is cooled and a precondensed mixture of 10 parts by weight of 2,4-diaminotoluene, 1 part by weight of triethylenetetramine, 13.5 parts by weight of terephthalic dialdehyde and 21.5 parts by weight of cyclohexyl-isocyanide is stirred into the reaction mixture at 80 to 90°. When the components have been thoroughly mixed, the mixture is poured into a mould preheated to 100° and is then heated for another 4 hours at 100°. An elastic synthetic resin is obtained.

*Example 2*

230 parts by weight of adipic acid-ethylene glycol polyester having terminal tetrahydrophthalic end groups (the same as in Example 1), 5 parts by weight of paraformaldehyde, 28 parts by weight of di-cyclohexylidene-m-phenylenediamine and 16 parts by weight of 2,6-diethylphenyl isocyanide are added together at 70° and then poured into a mould that has been preheated to 90°. A thermoplastic polyamide is obtained.

*Example 3*

900 parts by weight of linseed oil are reacted by known methods for ester interchange with 260 parts by weight of trimethylolpropane with alcoholate catalysis, and the product is subsequently esterified with 530 parts by weight of 1,2,4-benzene tricarboxylic acid and 190 parts by weight of citric acid. The acid polyester obtained (molecular weight 1000 to 2000) is dissolved in 120 parts by weight of hexamethylene diamine, 110 parts by weight of diethylenetriamine and 440 parts by weight of cyclohexanone dispersed in 2 litres of water. By stirring 460 parts by weight of di-(2-isocyanic-2-methyl-1-propyl)-carbonate (obtained from the corresponding formyl compound by splitting off of water by means of phosgene and triethylamine by known methods) into the mixture, a rapidly hardening water varnish which is subsequently cross-linked by the action of heat is obtained. The viscosity and binding time of the varnish may be regulated by varying the quantity of water. Cobalt naphthenate or dicumyl peroxide may be added as hardening agent.

*Example 4*

200 parts by weight of adipic acid-ethylene glycol polyester (hydroxyl number 56) are reacted with 33 parts by weight of 1,5-naphthylene-diisocyanate at 120°. The temperature is then allowed to drop to about 100° and 10 parts by weight of a dihydroxyisonitrile obtained by reacting 5-methyl-5-isocyanic-1,3-dioxan-2-one (obtained by known methods from the corresponding formamide) with ethanolamine are introduced. This polymeric isonitrile has a molecular weight of 10,000 to 20,000. 5.8 parts by weight of the poly Schiff's base obtained from cyclohexanone, terephthalic dialdehyde and hexamethylenediamine and 63 parts by weight of adipic acid-hexahydrophthalic acid-ethylene glycol polyester (the same as in Example 1) preheated to 100° are added immediately and the mixture stirred intensively, and the mixture is then poured into a preheated metal mould. The cross-linked polyamide obtained corresponds in its mechanical properties to an elastic synthetic material.

*Example 5*

200 parts by weight of polypropylene oxide (hydroxyl number 120) are reacted at 120–130° with 63 parts by weight of 4,4'-diphenylmethane-diisocyanate with stirring. After 3 to 5 minutes, 31 parts by weight of 1,2,4-benzene-tricarboxylic acid-mono-(6-hydroxy-1-hexyl)-ester are added. The mixture is cooled rapidly and a waxy product is thus obtained. This product is a polycarboxylic acid with a molecular weight of about 3000. When cold, 400 parts by weight of benzal-cyclohexylamine and 22 parts by weight of di-(2-isocyanic-2-methyl-1-propyl)-carbonate are rolled into the product. The product, which can be stored, is cross-linked at 130 to 160° and can be worked up like rubber.

*Example 6*

860 parts by weight of polyethyleneglycol (hydroxyl number 130, molecular weight 860) are reacted for 3 hours at 120 to 130° with 32 parts by weight of hexahydrophthalic acid anhydride. The reaction product is then immediately reacted with 240 parts by weight of 4,4'-dipenylmethane-diisocyanate at 100 to 110°. When the precondensate so obtained has been cooled to room temperature, 20 parts by weight of 1-methyl-3,5-diethyl-2,4-phenylenediisocyanide and 25 parts by weight of the poly Schiff's base of hexamethylenediamine, cyclohexanone and terephthalic dialdehyde (obtained from the components by reaction in boiling toluene) are incorporated by rolling. The product, which can be stored, can be cross-linked when moulded at 100 to 140°.

*Example 7*

300 parts by weight of the copolymer (molecular weight 25,000) of 95% styrene and 5% allylisocyanide, which may be obtained by the known process for obtaining polystyrene, 110 parts by weight of adipic acid-ethyleneglycol polyester (as in Example 1) and 49 parts by weight of cyclohexanone-α-naphthylimide are mixed together at 80° and then poured into a mould preheated to 100°. The mixture is then heated for another 4 hours at 100°.

The mixture of condensation components, which is not cross-linked, is stable on storage and may subsequently be cross-linked by heat and moulding.

*Example 8*

500 parts by weight of an adipic acid ethylene glycol polyester (hydroxyl number 53.5 and acid number 1.6) and 96 parts by weight of 1,2,4-benzene tricarboxylic acid anhydride are heated to a temperature of 130° C. for six hours. The reaction mixture is cooled and a waxy product is thus obtained (acid number 102), component A.

200 parts by weight of 2,2-dimethyl-3-hydroxy-propanol (component C) and 150 parts by weight of 3-amino-1-propanol (component B) are reacted in benzene at the boiling temperature of benzene. The reaction water is distilled off. Further distilling yields 162 parts by weight of a light yellow oil (boiling point: 150–156° C./0.3 torr).

108 parts by weight of adipic acid ethylene glycol-polyester (hydroxyl number 53.5 and acid number 1.6), 4.0 parts by weight of the component A and 19.0 parts by weight diphenylmethane-4,4'-diisocyanate are heated to a temperature of 100° to 110° C. for two hours. A light yellow product is obtained, having a consistency similar to natural rubber.

30.4 parts by weight of the component B and C product and 9.0 parts by weight of 3,3',5,5'-tetraethyl-diphenylmethane-4,4'-diisocyamide (component D) are rolled together with 262 parts by weight of the component A-diisocyanate product in a roll mill or a KO-kneader. A sheet is obtained which shows a good stability in storage.

By pressure forming during 10 minutes at a temperature of 106° to 108° C., there is obtained an elastic preform having a Shore hardness of 51 (DIN 53515, ASTM 676–59T) a tensile strength (tested from a ring having an outside diameter of 52.6 mm., an inside diameter of 44.6 mm. and a gage of 3.7 mm.) of 116 kg./cm.$^2$, an elongation at break of 745 percent, a stress at an elongation of 20 percent of 6.5 kg./cm.$^2$, at an elongation of 300 percent of 17.5 kg./cm.$^2$, an elongation of 1' after the break of 51 percent and a structural strength of 4.2 kg. (ring test).

What I claim is:

1. The process for the manufacture of polyamides which comprises reacting by contacting in an inert medium (A) a carboxylic acid compound selected from the group consisting of a monocarboxylic acid, a polycarboxylic acid, a carboxylic acid ester and a carboxylic acid anhydride, (B) an amino compound selected from the group consisting of a primary amine and a secondary amine, (C) a carbonyl compound selected from the group consisting of an aldehyde and a ketone, and (D) an isonitrile compound selected from the group consisting of an aliphatic isonitrile, an aromatic isonitrile, at least two of said compounds being bifunctional and at least one of the bifunctional condensation components having a molecular weight of between 300 and 200,000 and the molar ratios of said compounds being in the range of 50 to 100 percent of the equimolar ratios between carboxylic acid group, nitrogen group, carbonyl group and isonitrile group, said contacting is carried out at a temperature of about +10° C. to about 250° C. and recovering the formed polyamide.

2. The process of claim 1, in which an acidic polyester is used as the carboxylic acid compound.

3. The process of claim 2 in which said acidic polyester is a polyester from adipic acid, ethylene glycol and hexahydrophthalic acid anhydride having a molecular weight of about 300 to 9000.

4. The process of claim 2 in which said acidic polyester is a polyester from linseed oil, trimethylol propane and benzene - 1,2,4 - tricarboxylic acid, having a molecular weight of about 1000 to 2000.

5. The process of claim 2 in which said acidic polyester is a polyester from a polypropylene oxide, 4,4′-diphenyl-methane-diisocyanate and a 1,2,4-benzene-tricarboxylic acid ester.

6. The process of claim 2 in which said acidic polyester is a polyester from polyethylene glycol, 4,4′-diphenyl-methane-diisocyanate and a carboxylic acid anhydride.

7. The process of claim 1, in which a primary amine is used as the nitrogen compound.

8. The process of claim 1, in which said primary amine is 2,4-diaminotoluene.

9. The process of claim 1, in which said primary amine is di-cyclohexylidene-m-phenylene diamine.

10. The process of claim 1, in which said primary amine is hexamethylene diamine.

11. The process of claim 1, in which said primary amine is benzaldehydehexylamine.

12. The process of claim 1, in which said primary amine is triethylenetetramine.

13. The process of claim 1 in which an aldehyde is used as the carbonyl compound.

14. The process of claim 12, in which said aldehyde is terephthalic dialdehyde

15. The process of claim 12, in which said aldehyde is paraformaldehyde.

16. The process of claim 1, in which a ketone is used as the carbonyl compound.

17. The process of claim 15, in which said ketone is cyclohexanone.

18. The process of claim 1, in which said isonitrile is cyclohexyl-isocyanide.

19. The process of claim 1, in which said isonitrile is 2,6-diethylphenyl-isocyanide.

20. The process of claim 1, in which said isonitrile is di-(2-isocyanic-2-methyl-1-propyl)-carbonate.

21. The process of claim 1, in which said isonitrile is a polymeric dihydroxyisonitrile having a molecular weight of 10,000 to 20,000.

22. The process of claim 1, in which said isonitrile is 1-methyl-3,5-diethyl-2,4-phenylene-diisocyanide.

23. The process of claim 1, in which said isonitrile is a copolymer of 95 percent of styrene and 5 percent of allylisocyanide having a molecular weight of 25,000.

24. The process for the manufacture of polyamides which comprises reacting by contacting a carboxylic acid compound selected from the group consisting of a monocarboxylic, a polycarboxylic acid, a carboxylic acid ester and a carboxylic acid anhydride, an amine compound selected from the group consisting of a primary amine and a secondary amine, a carbonyl compound selected from the group consisting of an aldehyde and a ketone with an isonitrile compound consisting of an aliphatic isonitrile, an aromatic isonitrile and a heterocyclic isonitrile, at least two of said compounds being bifunctional and at least one of the bifunctional condensation components having a molecular weight of between 300 and 200,000 and the molar ratios of said compounds being in the range of 50 to 100 percent of the equimolar ratios between carboxylic acid, amino, carbonyl and isonitrile group, said contacting is carried out at a temperature of about +10° C. to about 250° C. in a solvent selected from the group consisting of water, an alcohol, an ester, an ether, an aldehyde, a ketone, a hydrocarbon and a halogenated hydrocarbon and recovering the formed polyamide.

25. A normally solid, substantially water-insoluble polyamide whose repeating unit consists of

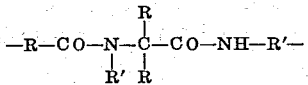

groups where each R is selected from the group consisting of hydrogen, an alkyl and an aryl radical and R′ is selected from the group consisting of hydrogen, an alkenyl, an arenyl and a cycloalkenyl radical, said repeating units being incorporated by polycondensation to produce said polyamide of (A) a carboxylic compound, (B) an amino compound, (C) a carbonyl compound, and (D) an isonitrile, at least two of said compounds being bifunctional and at least one of the bifunctional condensation components having a molecular weight of between 300 and 200,000 and the equimolar ratios of said compounds being in the range of between 0.5 to 1 and 1.5 to 1 per each individual reactive group.

26. A normally solid substantially water-insoluble polyamide from (A) a carbocylic acid-ethylene glycol polyester having a molecular weight of about 300 to 5000 (B) a primary diamine and a tetramine, (C) an aldehyde, and (D) a monoisocyanide.

27. A normally solid substantially water-insoluble polyamide from (A) a carboxylic acid-ethylene glycol polyester having a molecular weight of 300 to 5000, (B) a primary diamine and a triamine, (C) a ketone, and (D) a diisocyanide.

References Cited by the Examiner

UGI, Angewandte Chemie, 74, January-June 1962, pages 9–22.

LEON J. BERCOVITZ, *Primary Examiner.*

DONALD E. CZAJA, *Examiner.*

R. W. GRIFFIN, *Assistant Examiner.*